(12) United States Patent
Mizushima et al.

(10) Patent No.: US 6,982,111 B2
(45) Date of Patent: Jan. 3, 2006

(54) OPTICAL RECORDING MEDIUM AND RECORDING METHOD FOR OPTICAL RECORDING MEDIUM

(75) Inventors: Tetsuro Mizushima, Tokyo (JP); Koji Mishima, Tokyo (JP); Jiro Yoshinari, Tokyo (JP)

(73) Assignee: TDK Corporation, Tokyo (JP)

( * ) Notice: Subject to any disclaimer, the term of this patent is extended or adjusted under 35 U.S.C. 154(b) by 6 days.

(21) Appl. No.: 10/499,877

(22) PCT Filed: Dec. 6, 2002

(86) PCT No.: PCT/JP02/12834

§ 371 (c)(1),
(2), (4) Date: Jun. 24, 2004

(87) PCT Pub. No.: WO03/058612

PCT Pub. Date: Jul. 17, 2003

(65) Prior Publication Data

US 2005/0013963 A1 Jan. 20, 2005

(30) Foreign Application Priority Data

Dec. 28, 2001 (JP) ............................ 2001-401108

(51) Int. Cl.
*B32B 3/02* (2006.01)

(52) U.S. Cl. ............... 428/64.1; 428/64.5; 430/270.13; 369/59.11

(58) Field of Classification Search ............... 428/64.1, 428/64.4, 64.5, 913; 430/270.12, 270.13, 430/945; 369/59–11

See application file for complete search history.

(56) References Cited

U.S. PATENT DOCUMENTS 6,033,752 A 3/2000 Suzuki et al.
2004/0174796 A1 * 9/2004 Mizushima et al. .......... 369/94

FOREIGN PATENT DOCUMENTS

GB 2 336 463 A 10/1999

(Continued)

OTHER PUBLICATIONS

Kato, Tatsuya et al. *International Symposium on Optical Memory* "The phase change optical disc with the data Recording rate of 140 Mbps." Technical Digest ISOM 2001, pp. 200-201.

*Primary Examiner*—Elizabeth Mulvaney
(74) *Attorney, Agent, or Firm*—Oliff & Berridge, PLC

(57) ABSTRACT

To obtain an optical recording medium capable of recording at various recording transfer rates from a low speed to a high speed, by using a simple recording strategy.

A recording layer 18 of a write-once optical recording medium capable of recording from a low speed to a high speed is formed by laminating a first sub recording layer 18A and a second sub recording layer 18B each containing a metal as its main component. When the recording layer (laminated recording layer) 18 is irradiated with a laser beam having a wavelength equal to or shorter than a blue wavelength by using a recording strategy comprising only a ratio of write power to bias power, the main component metals contained in the first and second sub recording layers 18A, 18B diffuse and are thus mixed together, forming the sub recording layers into a single layer by means of such mixing and forming recording marks whose reflectance have been irreversibly changed. Since the recording mark formation process does not need to select a recording strategy, it is possible to obtain many subordinate advantages such as a variable speed recording.

7 Claims, 3 Drawing Sheets

FOREIGN PATENT DOCUMENTS

| | | |
|---|---|---|
| JP | A 4-838 | 1/1992 |
| JP | A 9-7176 | 1/1997 |
| JP | A 2001-101709 | 4/2001 |
| JP | A 2001-266402 | 9/2001 |

* cited by examiner

OPTICAL RECORDING MEDIUM AND RECORDING METHOD FOR OPTICAL RECORDING MEDIUM

TECHNICAL FIELD

The present invention relates to an optical recording medium and a recording method for the optical recording medium.

BACKGROUND ART

Now, in the market of optical recording medium there have been distributed rewritable optical recording media and so-called write-once optical recording media which are not rewritable. A rewritable optical recording medium, as meant by the word "rewritable," allows data to be written therein again and again, so that it is possible for the same optical recording medium to be used repeatedly in recording only required data. On the other hand, a write-once optical recording medium is not rewritable and thus characterized by a feature that "data will never be altered," thereby making itself useful in data distribution, storage, or backup.

In recent years there has been a demand for an optical recording medium which is capable of performing a stable high-density and high-speed recording when being used as multimedia for recording and editing music or moving images. As one of concrete measures, an attention is being given to an optical recording medium capable of performing recording/playback by means of a laser beam having a blue wavelength.

Conventionally, as a recording structure of a write-once optical recording medium, it has been suggested that organic dyes be applied to a substrate. However, such a recording structure has been found insufficient in its recording sensitivity when performing a high speed recording. On the other hand, if the wavelength of a laser beam is made short in order to increase a recording density, there will be a problem that it is difficult to synthesize dyes which can be used with laser beams having wavelengths equal to or shorter than that of a blue light.

Although there have been several suggestions (for example, Japanese Patent Publication No. Hei 4-838, etc.) that recording layer can be formed by an inorganic material, none of conventional structures is suitable for high density or high speed recording, their storage reliability of recorded state is inadequate, and their playback durability is insufficient.

For this reason, among various high density optical recording media using laser beams having wavelengths equal to or shorter than that of a blue light, what has been suggested as an optical recording medium capable of "high speed recording" is only a rewritable (RW) optical recording medium formed by using a phase-change material.

As one of important items required by a recording medium for use as a multimedia-compatible medium in recent years, there has been "stable recording at a variable speed" apart from "high-density and high-speed recording". For example, when recording music or moving images, it is absolutely necessary that the recording be performed along a real time. On the other hand, there has been a demand for using a high speed in performing a recording for editing the above information or making a copy for backing up a file which has already been completed (because the capacity of the file is large). For this reason, in recent years, "using the same recording medium to flexibly satisfy various uses from a low speed to a high speed" has become a significant task for an optical recording medium which can be used as a multimedia-compatible medium.

Further, although an optical recording medium, which has been treated such that its recording density has been improved in preference to other parameters, can be used to perform a recording by using CLV (Constant Linear Velocity) method, since a considerable amount of time is needed in controlling the rotational speed of the optical recording medium, such an optical recording medium is not suitable for use as a recording medium which is required to perform a high speed access and a high speed transfer. On the other hand, by making it possible to perform a stable recording at a variable speed, it is also possible to adopt ZCAV (Zoned Constant Angular Velocity) method which makes the rotational speed constant and ensures the same high density as in the CLV method.

As mentioned above, among high density optical recording media using laser beams each having a wavelength equal to or lower than the wavelength of a blue light, an optical recording medium which is capable of performing a high speed recording and has already been suggested is only a rewritable recording medium containing a phase-change material.

However, a rewritable optical recording medium, in an aspect of "recording at a variable speed" as mentioned above, has a problem that its flexibility is low. This is because an optical recording medium utilizing a phase-change material is realized by distinguishing two different states, one of which is an amorphous state formed by quenching and the other is a crystalline state formed by slow cooling (kept at a temperature equal to or higher than a crystallizing temperature for a predetermined time). Accordingly, in view of a heat interference, and since a time control of laser pulses is complex, it is usually necessary to employ a recording strategy having laser powers of three or more different levels, i.e., a recording strategy having three or more powers, as well as to perform a time control for each laser pulse.

Here, so-called recording strategy means a power control pattern of a laser beam for recording. Generally, it is not that a laser beam for recording (particularly when recording is performed on an optical recording medium formed by using a phase-change material) is used to continuously perform an irradiation corresponding to the length of recording mark. Rather, it is often that an irradiation is performed by using a laser beam as a pulse train consisting of a plurality of pulses and the width of each pulse in the pulse train is strictly controlled so as to control the shape of recording mark, as described in Japanese Patent Laid-Open Publication No. Hei 9-7176. A detailed arrangement of pulse dividing at this time is generally referred to as recording strategy.

Since it is necessary to strictly control various factors such as a cooling speed related to time, a rewritable optical recording medium is difficult in adjusting its recording strategy when a recording transfer rate has been changed, and its flexibility with respect to a variable speed recording is extremely low.

Moreover, a rewritable optical recording medium is weak in preventing a data alteration which is possibly caused by an intentional action or a negligence. Therefore, with regard to a high-density optical recording medium which can be used as multimedia and can often be used to handle files such as video and music having a high value as works, it has been desired to produce a rewritable optical recording medium capable of performing a recording with a high density and at a variable speed, i.e., from a low speed to a high speed.

DISCLOSURE OF THE INVENTION

The present invention has been accomplished in order to solve the above-described problems existing in prior art, and it is an object of the invention to provide a write-once optical recording medium which can perform a high-density and high-speed recording with a simple recording strategy, and can also highly maintain an adaptability to a low speed recording. Another object of the invention is to provide a recording method for the write-once optical recording medium. Further, the present invention is to provide an optical recording medium capable of performing not only a write-once recording but also a rewriting on the same optical recording medium which makes use of the above characteristics, and to provide a recording method for such an optical recording medium.

The above-mentioned objects can be achieved by the inventions indicated in the following (1) to (11).

(1) A recording method for an optical recording medium having a recording layer capable of recording information, characterized in that: the recording layer is formed of a laminated recording layer including at least two sub recording layers each containing one kind of metal as its main component; a laser beam having a predetermined recording strategy is irradiated onto the laminated recording layer beam so that the main component metals contained in the respective sub recording layers are diffused an mixed; the sub recording layers are changed to a single layer through the mixing so as to be recordable recording marks whose reflectance are irreversibly changed, and as the recording strategy, the same pattern is adopted, and a laser power is changed in response to a clock frequency using for recording, so that at least two recording transfer rates selected from a predetermined range are available on the same optical recording medium.

(2) The recording method for an optical recording medium according to claim 1, wherein the recording strategy of the same pattern comprises an arrangement for switching a laser power having only two values including a write power and a bias power.

(3) The recording method for an optical recording medium according to (1) or (2), wherein a laser power in the recording strategy is changed in response to the clock frequency, so that at least two recording transfer rates selected from a range of 35 Mbps to 100 Mbps are available on the same optical recording medium.

(4) The recording method for an optical recording medium according to any one of (1) to (3), wherein a wavelength of the laser beam is set within a range of 200 to 450 nm.

(5) The recording method for an optical recording medium according to any one of (1) to (4), wherein the optical recording medium is an optical recording medium for recording information under a control of a constant rotational angular velocity.

(6) A recording method for an optical recording medium having at least two recording layers capable of recording information, characterized in that: at least one of the recording layers is formed of a laminated recording layer including at least two sub recording layers each containing one kind of metal as its main component, a laser beam having a predetermined recording strategy is irradiated onto the laminated recording layer so that the main component metals contained in the respective sub recording layers are diffused and mixed, the sub recording layers are changed to a single layer through the mixing so as to be recordable recording marks whose reflectance are irreversibly changed; and as the recording strategy with respect to the laminated recording layer, a recording strategy of a pattern optimally set with respect to a selected recording layer other than the laminated recording layer is adopted.

(7) The recording method for an optical recording medium according to (6), wherein the selected recording layer other than the laminated recording layer is a rewritable recording layer containing a phase-change material.

(8) An optical recording medium characterized in that: a laminated recording layer having at least two sub recording layers each containing one kind of metal as its main component is formed; a laser beam having a predetermined recording strategy is to be irradiated onto the laminated recording layer so that the main component metals contained in the respective sub recording layers are diffused and mixed; the sub recording layer is changed to a single layer through the mixing so as to be recordable recording marks whose reflectance are irreversibly changed; and an arrangement for switching a laser power between only two values consisting of a write power and a bias power is adopted as the recording strategy.

(9) The optical recording medium according to (8), wherein the optical recording medium is an optical recording medium capable of recording information under a control of a constant rotational angular velocity.

(10) The optical recording medium according to (8) or (9), wherein a wavelength of the laser beam is set within a range of 200 to 450 nm.

(11) An optical recording medium having at least two recording layers capable of recording information, characterized in that at least one of the recording layers is formed of a laminated recording layer including at least two sub recording layers each containing one kind of metal as its main component, a laser beam having a predetermined recording strategy is to be irradiated onto the laminated recording layer so that the main component metals contained in the respective sub recording layers are diffused and mixed together, the sub recording layers are changed to a single layer so as to be recordable recording marks whose reflectance are irreversibly changed, and at least one of other recording is set as a rewritable recording layer containing a phase-change material, so that the same optical recording medium includes both a write-once portion and a rewritable portion.

The technical summary of this invention will be explained as follows.

An optical recording medium to which the present invention is applied has a laminated recording layer of a structure basically formed by laminating at least two sub recording layers. Each sub recording layer contains one kind of metal as its main component. Once the laminated recording layer is irradiated by a laser beam, the main component metals contained in the respective sub recording layers are diffused and thus mixed together in an irradiated area.

Recording marks formed by the diffusion and mixing reaction of the respective main component metals are extremely stable due to a single layer structure, and its reflectance has been irreversibly changed. Thus, the change of the reflectance can be caught as information, and such a recording mark after recording is not likely to change, even if the recording medium is stored or played-back in an environment of an elevated temperature.

The formation of the recording marks can be effected substantially only through heat amount control which is conducted for carrying out the diffusion and mixing of the main component metals in the sub recording layers by means of a laser beam irradiation. In this manner, it is allowed to simplify a recording strategy and to flexibly handle various recording speeds only through a simplified adjustment.

This means that when a recording is performed, it is allowed to adopt the simplest recording strategy as its recording strategy, such as an arrangement for switching a laser power having only two values including a write power and a bias power, also means that it is possible to flexibly deal with a linear velocity change from a low speed to a high speed only through an extremely simple adjustment.

As a result, although at a low cost, it is possible to perform a high density recording at a high speed, also a stabilized high density recording at a low speed. Therefore, it is possible to obtain an optical recording medium suitable for use as multimedia which is required to record large capacity information sometimes at a low speed and sometimes at a high speed. Further, such recording medium is suitable for use in CAV or ZCAV which performs a rotation control at a constant rotation angular velocity allowing a high speed transfer.

Incidentally, since the recording marks to be formed on the laminated recording layer of the present invention are formed irreversibly, the type of the recording medium of the present invention belongs to "write-once" type. However, the optical recording medium to which the present invention is applied, can make use of the flexibility of recording strategy, so that the medium has not only a write-once laminated recording layer, but also a rewritable recording layer.

Furthermore, although the present invention can obtain the above effects most remarkably when the present invention is applied to an optical recording media which has the laminated recording layer including at least two sub recording layers, a concept of the present invention itself is applicable to all kind of optical recording media.

BEST MODE FOR CARRYING OUT THE INVENTION

An embodiment of the present invention will be described in detail with reference to the accompanying drawings.

Figure 1:
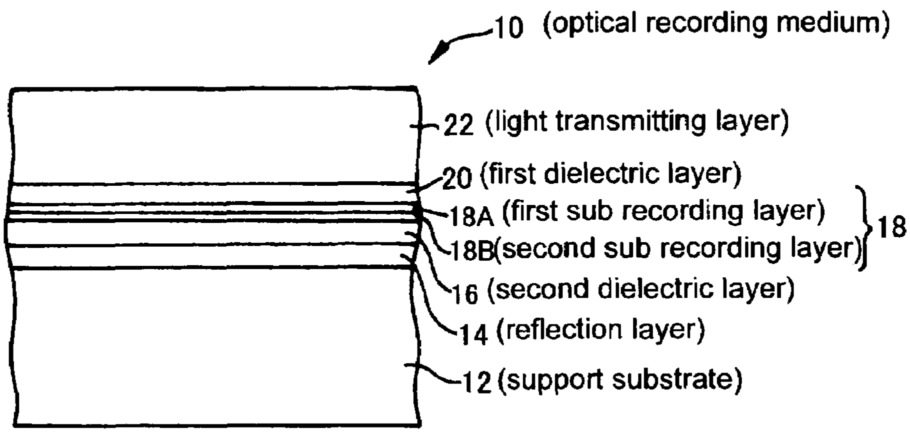
FIG. 1 is an enlarged cross sectional view schematically showing a high-speed write-once optical recording medium according to an example of an embodiment of the present invention.

As shown in FIG. 1, a high-speed high-density write-once optical recording medium (hereinafter referred to as optical recording medium) 10 to which the present invention is applied is formed by successively forming, on a support substrate 12, a reflection layer 14, a second dielectric layer 16, a recording layer (laminated recording layer) 18, a first dielectric layer 20, and a light transmitting cover layer 22. A blue laser beam having a wavelength of 405 nm, for example, is emitted by a recording laser beam source to irradiate the above-mentioned recording layer 18 through the light transmitting cover layer 22, thereby changing the reflectance of an irradiated area and using the irradiated area as a recording mark.

Preferably, at least one of the sub recording layers forming the recording layer 18 contains, as its main component metal, at least one of high reflectance metals including Al, Ag, Au, and Cu etc. In detail, it is allowed to use Al—Sb, Al—Ca, Al—Ce, Al—La, Al—Se, Au—Ce, Au—La, Au—Si, Au—Ge, Si—Cu, Ge—Cu, etc. Particularly, since Al and Ag exhibit high reflectivity even with a laser beam having a wavelength equal to or shorter than that of blue light, it is easy to adjust the reflectance by changing the thickness of sub recording layers. Further, it is possible to set the reflectance of a non-recorded portion at a value higher than the reflectance of a portion in which recording mark has been formed, thus providing a more preferable result.

Moreover, it is more preferable to form an inter-metallic compound having a melting point higher than either any one of the sub recording layers or any one of the above main component metals.

When a blue laser beam is used as a recording beam to irradiate the recording layer 18, the main component metals contained in first and second sub recording layers 18A and 18B will diffuse and are thus mixed together in an irradiated area, thereby producing a reaction product which is a single layer formed by such a mixing. Further, such a reaction product changes the reflectance of the irradiated area, thus forming recording mark which can be recognized. In this way, since the above reaction involving diffusion of the two main component metals as well as the mixing thereof is irreversible, the recording layer 18 can be used to perform write-once optical recording.

The thickness of the recording layer 18, which is an entire thickness including the first and second recording layers 18A and 18B, is set to be 3 to 50 nm, preferably 5 to 20 nm. Qualitatively, if the recording layer 18 (including sub recording layers 18A and 18B) is too thin, it will be difficult to ensure an adequate reflectance difference in a recording mark between a state before recording and a state after recording. On the other hand, if the recording layer 18 is too thick, a heat capacity will become large, hence reducing a recording sensitivity.

Accordingly, the thickness of the sub recording layers 18A and 18B should be appropriately set such that a high thermal stability can be obtained and recording mark having large reflectance difference can be formed. For example, when a sub-recording layer containing Al as its main component is combined with a sub-recording layer containing Sb as its main component, it is allowed to consider that an inter-metallic compound will be formed by combining Al with Sb at a ratio of 1:1. Therefore, it is preferable to set the thickness of each sub-recording layer in a manner such that a ratio (atomic ratio) of Al to Sb in the recording layer 18 will not deviate greatly from 1:1.

The first and second dielectric layers 20, 16 may be formed by various dielectric materials including an oxide, a sulfide, a nitride, a fluoride, and a carbide, or mixtures thereof. In the present embodiment, the first and second dielectric layers 20, 16 are all formed through sputtering using ZnS—$SiO_2$ target (ZnS: 80 mol %, $SiO_2$: 20 mol %).

The first dielectric layer 20 has a thickness of 5 to 200 nm and is provided to cooperate with the second dielectric layer 16 so that the recording layer 18 can be interposed between the two dielectric layers. Here, the second dielectric layer 16 has a thickness of 5 to 200 nm and is provided on the reflection layer 14.

The first and second dielectric layers 20, 16 also serve to protect the recording layer 18 from vapor or other gases. Further, by adjusting the thickness of these dielectric layers, it is possible to interfere the laser beam by the adjusted thickness, and to adjust the reflectance of non-recorded portion of the recording layer 18, as well as to further increase a reflectance difference between a state before recording and a state after recording.

The support substrate 12 comprises a polycarbonate plate having a thickness of 1.1 mm.

Moreover, the reflection layer 14 is for example a silver alloy layer having a thickness of 10–200 nm, which is formed on the support substrate by means of sputtering or the like. When viewed from the incident side of the laser beam, such reflection layer 14 is located inwardly of the recording layer 18. By providing a returning beam to the recording layer 18, it is possible to increase the reflectance difference between a state before recording and a state after recording, as well as to improve a recording sensitivity because of the reflection layer 14. Specifically, the reflection layer 14 is formed by a metal (including metalloid) film or a dielectric multi-layer film. In the present embodiment, the reflection layer 14 is formed by an alloy which is AgPdCu, having a thickness of 100 nm and containing silver as its main component. However, such a reflection layer 14 is not absolutely indispensable.

The light transmitting cover layer 22 is formed by spin-coating the first dielectric layer 20, or formed by bonding thereon a sheet-like material shaped in advance, such as an ultraviolet setting resin layer or a polycarbonate sheet. The thickness of the light transmitting cover layer 22, or an entire thickness including the cover layer 22 and the first dielectric layer 20, should be selected such that when the numerical aperture (NA) of an objective lens 26 at the time of irradiating the recording layer 18 with a blue laser beam having a wavelength of 405 nm is set at 0.85, the blue laser beam can be converged on the recording layer 18. In the present embodiment, such an entire thickness is set at 100 $\mu$m.

Specifically, the optical recording medium 10 of the present embodiment is characterized in that if the recording layer 18 comprises a first sub recording layer 18A containing Al as its main component and a second sub recording layer 18B containing Sb as its main component, the thermal stability (namely, thermal stability after recording) of reaction product in recording mark formed on the recording layer 18 will be higher than a thermal stability (namely, thermal stability before recording) when the first and second sub recording layers 18A, 18B are simply laminated on non-recorded portion.

In more detail, during an irradiation using a laser beam, the main component metals contained in the first and second sub recording layers 18A and 18B will diffuse respectively and be mixed together, thereby forming an inter-metallic compound. On the other hand, even if an inter-metallic compound is not formed, it is allowed to consider that at least the main component metals will be combined with each other, thus forming a mixture. Thus, since a reaction product formed by such a mixing can irreversibly alter the reflectance of an irradiated area, it is allowed to make use of the reflectance variation as a recording mark.

The melting point of Al is 660° C. and the melting point of Sb is 631° C. Namely, both of them have melting points considerably higher than 500° C. and have sufficient thermal stability when existing as simple substance, and can be fused upon being irradiated by a laser beam. Further, by means of a reaction between Sb and Al, it is possible to form a stable inter-metallic compound AlSb (melting point: 1060° C.) whose melting point is sufficiently higher than that of each respective simple substance and whose crystal structure will not change either at a low temperature or at an elevated temperature. On the other hand, an inter-metallic compound such as AlSb is not necessary to be in crystal growth, and is capable of recording even in a microcrystal state which can not be detected by an electron ray diffraction.

Upon catching the above facts as phenomenon, when the recording layer 18 is irradiated with a laser beam having a write power Pw capable of forming recording mark, the following facts can be confirmed: A) in some areas of the recording layer 18 in which mixing has not occurred, such mixing will thus occur and reflectance will be changed (recording becomes possible), B) in other areas in which recording marks have already been formed, reflectance will not be changed even if these areas are irradiated by the recording beam, thereby providing ideal characteristics as write-once type.

Therefore, the optical recording medium 10 is such that its recording marks comprising the above-mentioned reaction product are not easy to change and they are stable even if the recording medium is stored in a high temperature environment after recording. Further, the recording marks are not likely to change even if the recording medium is subject to a continuous playback, thereby exhibiting an excellent playback durability. Moreover, even if the reflectance after formation of recording marks is set to be low and light absorption rate after formation of recording marks is set to be high, since the thermal stability of recording marks is high, the recording medium will not get deteriorated by an irradiation of a playback laser beam.

Moreover, since the thermal stability of recording marks is high, a phenomenon of accidentally erasing the recording marks in an adjacent track (cross erase) at the time of recording can be substantially prevented. In this way, since it is possible to make narrow the pitch of recording tracks, such an optical recording medium can be effectively used in high density recording.

Then, more important than anything else, the optical recording medium 10 has a big merit that apart from combining sub recording layers containing Al and Sb as their main component metals, a necessary operation is only a heat amount control (an irradiation energy control) which carries out a predetermined diffusion and mixing among main component metals in the first and second sub recording layers 18A and 18B substantially by means of laser beam irradiation.

Further, since a metal material having a high conductivity is used in the laminated recording layer, it is not necessary to take into consideration an influence of a heat interference occurring in the write-once optical recording medium containing dye materials.

Furthermore, by controlling heat capacity through adjustment of the thickness of the laminated recording layer, it is possible to obtain a sufficient recording sensitivity even when a recording is performed at a high speed.

Accordingly, the present embodiment has adopted, as a strategy at the time of recording, a simple arrangement which only switches a laser power having only two values involving a write power Pw and a bias power Pb, thus making full use of the fundamental feature of the optical recording medium 10.

A write power Pw at this time may be changed in accordance with a recording transfer rate (or a linear velocity), and can be set within a range of 2.5 to 7.5 mW. Qualitatively, there is a tendency that a higher recording transfer rate causes a larger write power Pw.

On the other hand, a bias power Pb is allowed to be constant without having to be changed according to a recording transfer rate (or a linear velocity). Of course, such a bias power can be changed in accordance with a recording transfer rate. Incidentally, the control arrangement can be further simplified if a bias power Pb is made coincident with a read power Pr itself. Incidentally, a preferable range of a read power Pr is 0.3 to 1.3 mW, more preferably 0.4 mW or more as a lower limit and 1.0 mW or less as a higher limit.

The following description is given to explain an operation of the recording method for the optical recording medium of the present embodiment.

A high-density and high-speed rewritable recording using a phase-change material presently available requires, as described above, a recording strategy using three powers to distinguish a quenching from a slow cooling.

For example, in order to form amorphous recording marks (i.e., perform recording), it is necessary to quench, by means of a second laser power, the recording layer once heated to its melting point by a first laser power, using a cooling speed equal to or higher than a critical cooling rate. Accordingly, in order to avoid a recrystallization during a low speed recording (a low linear velocity), the recording layer must have a corresponding thermal conductivity (heat dissipation ability). On the other hand, in order to erase amorphous recording marks once formed, it is necessary to have the recording layer kept at a temperature equal to or higher than a crystallizing temperature and equal to or lower than a melting point (in order to realize a slow cooling) for a predetermined time, using a third laser power. However, when an erasing is to be realized at a high speed (a high linear velocity), since the time for the above keeping has to be shortened, at the time of performing an irradiation using a laser beam, a heat distribution of the recording layer in an irradiated area is likely to become steep both in time and space, resulting in a possibility that the erasing is not complete. In order to cope with such a problem, it is necessary to use a material allowing quick crystallization in the recording layer, provide a dielectric layer or take some other measure so as to form an arrangement in which heat is not easy to escape, thereby completing the crystallization, i.e., the erasing of recording marks within a relatively short time. However, when designing a material or a laminated structure for use in a recording layer to make it suitable for a high speed recording, if a recording is to be performed on such an optical recording medium at a low (slow) recording transfer rate, the above-described problem "it becomes impossible to ensure a quenching velocity at the time of forming recording marks, and a recrystallization at the time of recording is apt to occur" will cyclically happen again.

In view of the above, in order to maintain good recording characteristics from a low speed recording to a high speed recording through a recording using a phase-change material, it is necessary to at first fully examine a material for forming the recording layer and the thickness thereof, and then at the time of recording, to finely adjust a three-power recording strategy according to a recording speed at that time, hence forming a complex control arrangement and making it impossible to avoid a high cost. Further, difficulty occurs also in the field of hardware which requires that a laser device and other IC portions be driven at a high speed with a high precision. Moreover, even if these problems have been solved at a certain expense, an actual situation is that a variable speed recording can be performed only in a very narrow range (about 10 to 30 Mbps).

In contrast, with the recording layer 18 (laminated recording layer) of the present embodiment, it is substantially sufficient only to perform a heat amount control for carrying out a predetermined diffusion and mixing among the main component metals in the first and second sub recording layers 18A and 18B through an irradiation using a laser beam.

Therefore, by adopting for example a recording strategy involving only two values, it is possible to deal with a change in a linear velocity from a low peed to a high speed, substantially by changing only a write power Pw (and bias power Pb) and a switching speed.

Figure 2:
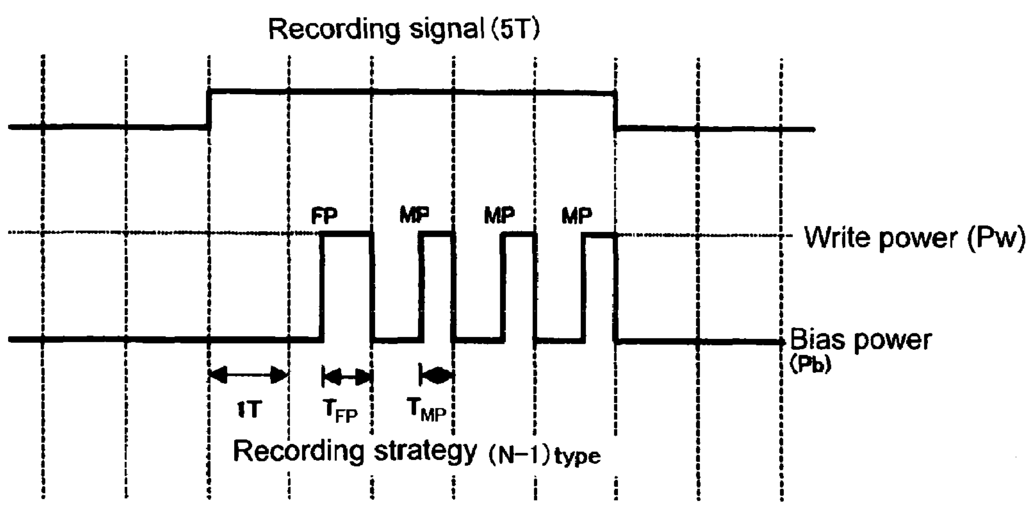
FIG. 2 is a diagram showing an example of the pattern of a recording strategy.

In particular, when a recording transfer rate is changed by changing a clock frequency at the time of recording and then recorded, it is possible to perform a precise recording from a low speed to a high speed, by using a recording strategy of the same pattern (a multi-pulse train set in accordance with each mark length, with respect to a certain recording frequency 1/T, refer to FIG. 2) and changing the laser power.

Using the recording method adopting a recording strategy of the same pattern, a time control of laser pulse when the recording transfer rate has changed not only causes itself to be in synchronization with the recording frequency, but also makes it possible to dispense with a complex recording strategy control.

By means of this, a recording based on a large range of recording transfer rate and using the same optical recording medium becomes possible and easy. Moreover, a strategy of two-power recording can easily control the rise and fall of a laser pulse at the time when the recording frequency has been at a high frequency, thereby rendering itself suitable for a high speed recording.

Therefore, by using this recording method when the recording transfer rate is constant, it is possible to provide a recording medium and a recording method suitable for a high speed recording.

According to an experiment conducted by the inventors, it has been confirmed that the present invention makes it possible not only to perform a high density recording using a laser beam having a short wavelength which is equal to or shorter than 405 nm, but also to realize a recording at any optional speed within a range of 35 Mbps to 100 Mbps.

Here, the recording transfer rate 35 Mbps is a rate formed by taking an efficiency into consideration, under a condition where a modulation manner is (1, 7) RLL, a recording linear velocity is 5.3 m/s, a clock frequency is 66 MHz, and a format efficiency is 80%.

As a result, although at a low cost, it is possible to perform a high density recording at a high speed, and also to stabilize and perform a high density recording at a low speed, thereby making it possible to obtain an optical recording medium suitable for use as a multimedia-compatible medium which is required to record large capacity information sometimes at a low speed and sometimes at a high speed. Namely, for example, such an optical recording medium may be used to store or backup, at a high speed and within a short time, files formed by directly dubbing, as an immediate measure and at a "low linear velocity", original images played back at real time from video movies, or musics transmitted at real time from the Internet or the like, followed by editing and rendering these data using a hard disk drive.

The embodiment of the present invention has been described based on a method using a constant recording transfer rate, in which a rotation control is performed on an optical recording medium at a constant linear velocity, and on an example in which a recording is performed on optical recording media of the same structure and the same composition, using different recording speeds. Since this method is a control laying stress on a recording density and taking considerable time in rotation control, such a method is not suitable for a high transfer rate recording.

On the other hand, there are various methods of performing a rotation control at a constant angular velocity, and these methods are suitable for a high transfer rate recording. Once such a rotation control is performed, it seems that a linear velocity at the time of recording changes from a low speed to a high speed from the inner circumference towards the outer circumference on the same optical recording medium. The present invention is applicable to such a variable transfer rate recording. Namely, when a recording is performed at a variable transfer rate whose clock frequency is changed during the recording, the recording can be carried out precisely from a low speed to a high speed by using a recording strategy of the same pattern and changing a laser power. Similar to that described above, using a recording method adopting a recording strategy of the same pattern, a time control of laser pulse at the time when a recording transfer rate has changed, only requires a synchronism with a recording frequency, without having to perform a troublesome recording strategy control.

By means of this, a recording based on a large range of recording transfer rate and using the same recording medium becomes possible and easy. Moreover, a strategy of two-power recording can easily control the rise and fall of a laser pulse at the time when the recording frequency has been at a high frequency, thereby rendering itself suitable for a high speed recording.

EXAMPLE 1

Example Using Al and Sb as Main Component Metals.

An optical recording medium was produced in accordance with an arrangement shown in FIG. 1, an evaluation was conducted on a variable transfer rate.

The support substrate 12 was formed by a polycarbonate substrate of 1.1 mm having groups formed thereon at group pitch of 0.32 $\mu$m, while the thickness of the light transmitting cover layer 22 was set at 100 $\mu$m.

Other layers were produced by sputtering under the following condition.

Electrostatic layer: $ZnS+SiO_2$ (80:20 mol %)

First dielectric layer 20: 60 nm

Second dielectric layer 16: 105 nm

First sub recording layer 18A: AlCr (98:2 at. %) 4 nm

Second sub recording layer 18B: Sb 6 nm

Reflection layer 14: AgPdCu (98:1:1 at. %) 100 nm

Random signals were recorded and playback was evaluated by an evaluation apparatus whose laser beam has a wavelength of 405 nm and whose objective lens group has a numerical aperture NA of 0.85, using modulation manner of (1, 7) RLL and in accordance with each recording transfer rate (changing linear velocity and clock frequency).

A multi-pulse strategy used in recording is an (n−1) type strategy shown in FIG. 2, with 2T recorded by 1 pulse of FP (first pulse), 5T recorded by 3 pulses of FP and MP (multi-pulse), thus recording by a total of 4 pulses.

The respective lengths of pulses were set at TFP: 0.5T, TMP: 0.4T.

A read power (Pr) and a bias power (Pb) were all set at 0.5 mW.

Under the above condition, the recording transfer rate was changed, an identical recording strategy in synchronization with the clock frequency corresponding to the transfer rate was employed, only the light power (Pw) was changed, and recording was performed.

The evaluation results are shown in the following table.

TABLE 1

| Recording transfer rate | Clock frequency 1/T | Recording linear velocity (m/S) | Pw (mW) | Jitter (%) |
|---|---|---|---|---|
| 35 Mbps | 66 MHz | 5.3 | 3.5 | 7.9 |
| 70 Mbps | 132 MHz | 10.6 | 4.5 | 8.2 |
| 100 Mbps | 189 MHz | 15.1 | 5.5 | 8.2 |

The playback Jitter value of random signal has achieved a value of less than 10% which is sufficient as an actually applicable signal, within a recording transfer rate range of 35 to 100 Mbps.

By using the recording medium and the recording method of the present embodiment, it is possible to easily perform a recording based on a variable transfer rate within a predetermined range of 35 Mbps to 100 Mbps. Further, it is also possible to use a two-power strategy to achieve a recording based on a high transfer rate of 100 Mbps which failed to be achieved until now.

According to the present embodiment, it is possible to obtain an optical recording medium capable of achieving a high recording density of about 17 Gbit/in$^2$ and ensuring a variable transfer rate.

EXAMPLE 2

Example Using Si and Cu as Main Component Metals.

An optical recording medium was produced in accordance with an arrangement shown in FIG. 1, an evaluation was conducted on a variable transfer rate in the same manner as in Example 1.

A support substrate and a light transmitting cover layer were formed in the same manner as in Example 1.

Other layers were produced by sputtering under the following condition.

Electrostatic layer: $ZnS+SiO_2$ (80:20 mol %)

First dielectric layer 20: 22 nm

Second dielectric layer 16: 28 nm

First sub recording layer 18A: Si 5 nm

Second sub recording layer 18B: Cu 6 nm

Reflection layer 14: AgPdCu (98:1:1 at. %) 100 nm

The strategy used in the recording was such that the lengths of pulses in (n−1) type were set at TFP: 0.4T, TMP: 0.3T.

A read power (Pr) and a bias power (Pb) were all set at 0.4 mW.

Others are the same as those in Example 1, such that the recording transfer rate was changed, an identical recording strategy in synchronization with the clock frequency corresponding to the transfer rate was employed, only Pw was changed, and recording was performed.

The evaluation results are shown in the following table.

TABLE 2

| Recording transfer rate | Clock Frequency 1/T | Recording linear velocity (m/S) | Pw (mW) | Jitter (%) |
|---|---|---|---|---|
| 35 Mbps | 66 MHz | 5.3 | 4.5 | 8.5 |
| 70 Mbps | 132 MHz | 10.6 | 5.8 | 8.8 |
| 100 Mbps | 189 MHz | 15.1 | 7.0 | 8.9 |

Similar to Example 1, the playback Jitter value of random signal has achieved a value of less than 10% which is sufficient as an actually applicable signal, within a recording transfer rate range of 35 to 100 Mbps.

Incidentally, in the optical recording medium formed in the example of the above embodiment, although the recording layer 18 is provided between the first and second dielectric layers 20 and 16, the present invention should not be limited as such, because the dielectric layers are not absolutely necessary.

Further, although the recording layer 18 comprises the first and second sub recording layers 18A and 18B, such sub recording layers are also allowed to be three or more layers and any of the sub recording layers may be located on the incident light side, provided that the recording layer comprises at least two sub recording layers.

Moreover, although the first and second sub recording layers 18A and 18B forming the recording layer 18 are allowed to contain only main component metals, it is also possible to add some other elements in these sub recording layers.

However, at this time, the content of main component metal contained in each sub recording layer is preferably 80 atom % or more. If the content of main component metal contained in each sub recording layer is too less, it will be difficult to sufficiently increase a reflectance difference between a state before mixing and a state after mixing.

Furthermore, although the above-described embodiment shows that the recording layer 18 is formed such that the first sub recording layer 18A and the second sub recording layer 18B are in direct contact with each other, it is also allowed to interpose an intervening layer containing other element as its main component between the two sub recording layers.

The light transmitting cover layer 22 protects the recording layer 18, while the material forming the cover layer should not be limited to an ultraviolet-setting resin, provided that it permits the transmission of a recording/playback beam.

In addition, although the optical recording medium 10 in the example of the above-described embodiment includes a reflection layer comprising an alloy containing silver as its main component, the present invention should not be limited as such, since the reflection layer is not absolutely necessary. Besides, a material for forming such a reflection layer can be a metal (including metalloid) film, a dielectric multi-layered film or the like, provided that it can reflect a recording/playback beam.

Further, although the above-described embodiment shows that when detailed information is to be recorded on the optical recording medium 10 the wavelength of a laser beam is set at a blue wavelength of 405 nm, it is also possible to set such a wavelength at a value equal to or shorter than 405 nm. Rather, it can be said that only when performing a high speed recording under such a condition, it is possible to make full use of the advantages of the present invention. On the other hand, it has been confirmed that the predetermined advantages of the present invention can also be obtained by using a laser beam having a red wavelength level which is longer than a blue wavelength (concretely, a laser beam within a range of 450 nm to 700 nm). Therefore, if a further lower cost is to be realized, the present invention may also be applied to a laser irradiation system using a red wavelength.

In the following, description is given to explain a case in which the present invention is applied to a multi-layered optical recording medium, particularly to a multi-layered optical recording medium which functions both as a write-once recording medium and a rewritable recording medium. Here, the multi-layered optical recording medium has a structure in which a plurality of recording layers are laminated through intermediate layers (transparent intermediate layers) having a transparency with respect to a recording/playback laser beam, and is a medium containing a recording layer capable of performing a recording/playback by means of a laser beam irradiating through other recording layers. When the present invention is applied to such a multi-layered recording medium, at least one of the recording layers should be formed into the same structure as the recording layer (laminated recording layer) 18 described above.

The multi-layered optical recording medium to which the present invention is applied has a flexibility that a recording layer other than the laminated recording layer of the present invention may be any kind of a recording layer. Namely, other recording layers than the laminated recording layer may include a rewritable recording layer containing a phase-change material or a write-once recording layer comprising a reflection layer having formed thereon prepits, without having to receive any particular limitation.

This is because the laminated recording layer according to the present invention is characterized by the following features: 1) recording marks can be formed only by instantaneously melting a plurality of metal layers, without having to take into consideration a cooling rate; 2) it is not necessary to provide a heat dissipation layer for cooling; 3) recording power margin is broad; 4) it is possible to perform various recordings from a low speed to a high speed; 5) degree of freedom with respect to thermal design is high. Therefore, it is not necessary to strictly control a recording strategy, thus providing a flexibility that the laminated recording layer can easily adapt itself to the characteristics required by a related recording layer.

Generally, with an optical recording medium having two or more recording layers, it is necessary to form an optimum recording condition for each layer. In particular, as in a write-once type and a rewritable type, it is difficult to realize a practical application for a multi-layered optical recording medium in which the patterns of fundamental recording strategies are completely different.

However, with a multi-layered optical recording medium having such a laminated recording layer, it is allowed to use, as its recording strategy and without any processing, a recording strategy having a pattern optimally set with respect to recording layers other than the laminated recording layer. Further, a process of using, without any alteration, the pattern of a recording strategy set for a rewritable recording layer, increasing or decreasing an entire power level and changing a switching velocity including a duty ratio control so as to adjust the above pattern to make it useful with the laminated recording layer, can be easily accomplished electrically.

As a result, by means of such multilayered recording medium, it is possible to have a write-once recording layer and a rewritable recording layer mixed in the same optical recording medium. Then, for example, a provider can record a predetermined file or a program in the write-once recording layer portion (if necessary, in the form not allowing further recording) and provide it to a user. On the other hand, a user can use the rewritable recording layer portion and deform the portion into various shapes so as to repeatedly perform overwriting.

Namely, it is possible to form an optical recording medium having advantages provided by both a write-once medium and a rewritable medium. Of course, the use of such recording medium should not be limited to the above example.

As to the rewritable recording layer portion, since a recording strategy can be made exclusive only for a high speed recording, it is possible to directly open a file on the recording layer and perform an overwriting storage thereon, without having to make a copy for each file in a hard disk drive.

If necessary, a backup storing may be performed in the write-once recording layer portion of the same recording medium (through the hard disk drive).

EXAMPLE 3

Example of Multilayer

Figure 3:
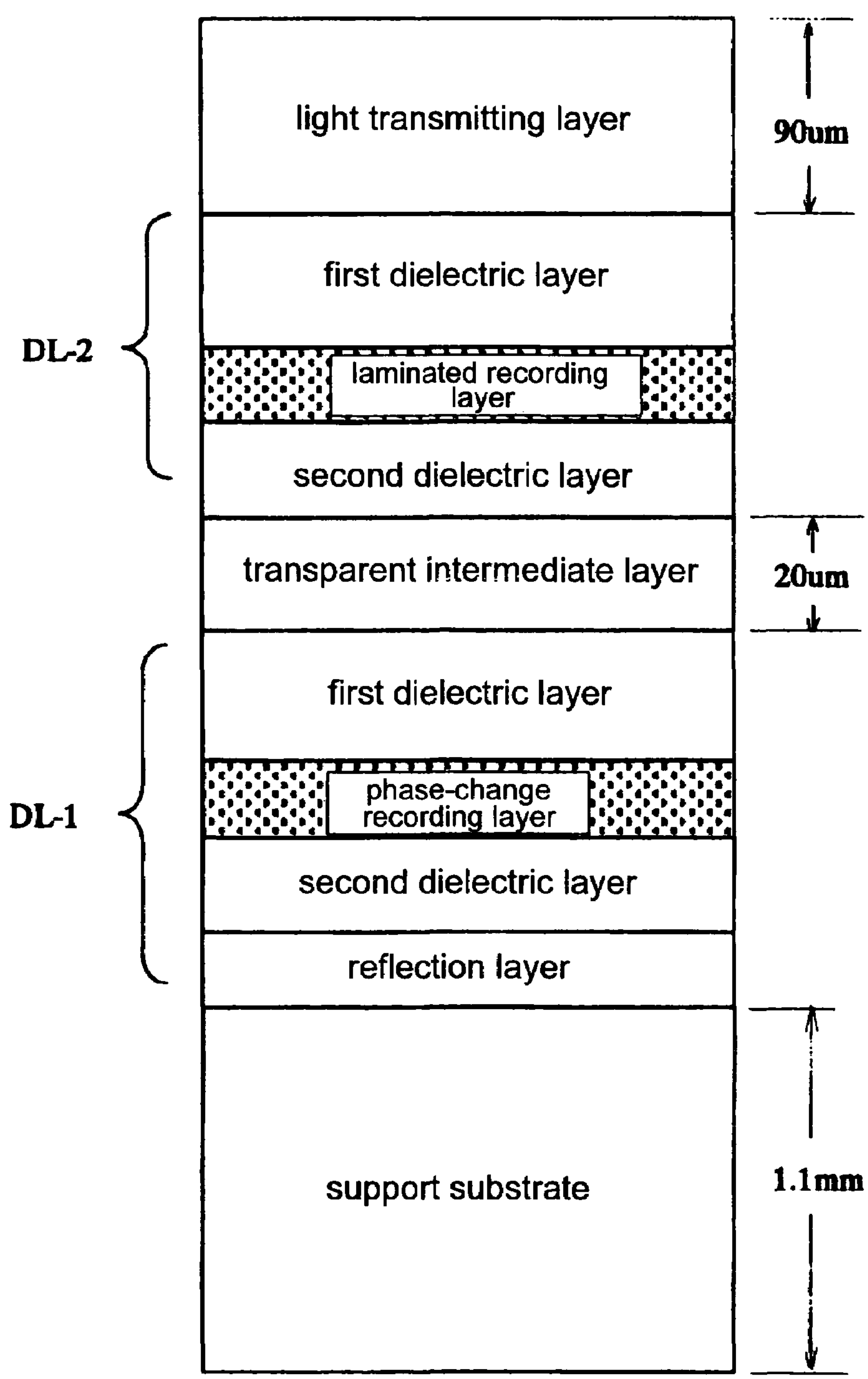
FIG. 3 is a cross sectional view showing an example of a multilayered recording medium which can be used as a write-once recording medium and a rewritable recording medium.

An optical recording medium was made in accordance with an arrangement shown in FIG. 3, and an evaluation was conducted on the recording and playback of the multilayered recording medium.

This sample has two data layers separated from each other by a transparent intermediate layer. A laser beam is incident on the data layers from a light transmitting layer side so as to perform recording or playback on the two data layers.

The support substrate was formed by a polycarbonate substrate of 1.1 mm having groups formed thereon at group pitch of 0.32 μm.

The transparent intermediate layer, after being coated with an ultraviolet-setting resin by means of spin coating, is pressed by a stamper having a group pattern, and at the same time irradiated by an ultraviolet light so as to be cured and thus formed into a predetermined shape. Incidentally, this group pattern is the same as the group pattern on the support substrate, while the thickness of the transparent intermediate layer after curing was 20 μm.

The thickness of the light transmitting cover layer was set at 90 μm.

Other layers were produced by sputtering under the following condition.

DL-1 rewritable type (phase-change recording layer) data layer

Dielectric layer: $ZnS+SiO_2$ (80:20 mol %)

First dielectric layer: 60 nm

Second dielectric layer: 20 nm

Phase-change recording layer: AgGeInSbTe (4:2:2:68:24 at. %) 12 nm

Reflection layer 14: AgPdCu (98:1:1 at. %) 100 nm

DL-2 write-once type (laminated recording layer) data layer

Dielectric layer: $ZnS+SiO_2$ (80:20 mol %)

First dielectric layer: 40 nm

Second dielectric layer: 70 nm

First sub recording layer 18A: AlCr (98:2 at. %) 3 nm

Second sub recording layer 18B: Sb 5 nm

Random signals were recorded on each data layer at a recording transfer rate of 35 Mbps and playback was evaluated by an evaluation apparatus whose laser beam has a wavelength of 405 nm and whose objective lens group has a numerical aperture NA of 0.85.

Figure 4:
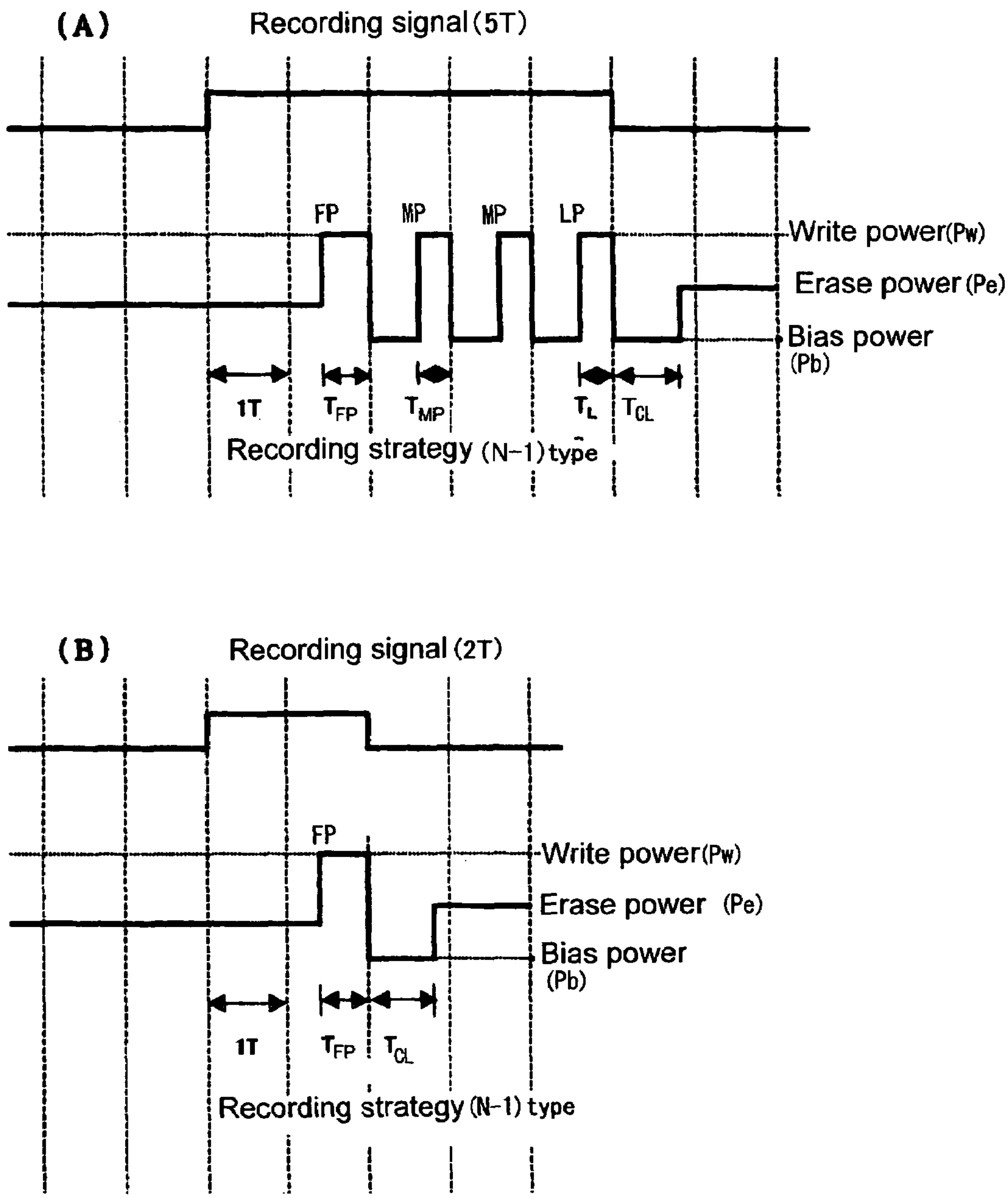
FIG. 4 is a diagram showing an example of the pattern of a recording strategy of the above-mentioned media.

A multi-pulse strategy used in recording is, as shown in FIG. 4, a strategy for setting the lengths of FP (first pulse), MP (multi-pulse), LP (last pulse), and CL (clean pulse), as well as the laser powers of three levels of Pw (write power), Pe (erase power), and Pb (bias power).

This time, as a strategy of (n−1) type, what was used is a strategy for recording 2T with one pulse of FP, 5T with FP, 2 pulses of MP, and LP, i.e., a total of 4 pulses.

As a strategy capable of recording signals on DL-1 phase-change recording layer, the respective lengths of pulses were set such that TFP is 0.4T, TMP is 0.4T, TLP is 0.5T, and TCL is 0.8T.

Recording transfer rate was set at 35 Mbps, random signals were recorded on DL-1 and DL-2 with the laser powers shown in the following Table 3, while playback was performed with Pr: 0.5 mW. Playback Jitter values of the signals have become those shown in Table 3.

TABLE 3

| | Pw (mW) | Pe (mW) | Pb (mW) | Jitter (%) |
|---|---|---|---|---|
| DL-1 | 10 | 5 | 0.3 | 8.4 |
| DL-2 | 4 | 0.8 | 0.3 | 8.1 |

On both DL-1 and DL-2, the playback Jitter values of the random signals have arrived at values of less than 10% which are sufficient for use as actually applicable signals.

By using the medium and recording method of the present invention, it is possible to easily perform recording and playback on a multi-layered medium with the same recording strategy (a strategy most suitable for a phase-change recording layer).

Moreover, it has become possible to achieve a multi-layered recording medium which can be used as both a write-once type and a rewritable type.

INDUSTRIAL APPLICABILITY

The present invention makes it possible to provide a write-once optical recording medium capable of performing a high density recording at a high speed with a simple recording strategy, and highly maintaining an adaptability to a low-speed recording on the same optical recording medium, as well as to provide a recording method for such an optical recording medium. Further, the present invention can also provide an optical recording medium capable of performing not only a write-once recording but also a rewriting on the same optical recording medium which makes use of the above characteristics, and provide a recording method for such an optical recording medium.

What is claimed is:

1. A recording method for an optical recording medium having a recording layer capable of recording information, comprising following steps of:

adopting a same pattern as the recording strategy for recording the information; and changing a laser power in response to its clock frequency used for recording so that at least two recording transfer rates selected from a predetermined range are available on the same optical recording medium.

2. The recording method for an optical recording medium according to claim 1, wherein the recording strategy of the same pattern comprises an arrangement for switching the laser power between only two values including a write power and a bias power.

3. The recording method for an optical recording medium according to claim 1, wherein a laser power in the recording strategy is changed in response to the clock frequency, so that at least two recording transfer rates selected from a range of 35 Mbps to 100 Mbps are available on the same optical recording medium.

4. The recording method for an optical recording medium according to claim 1, wherein a wavelength of the laser beam is set within a range of 200 to 450 nm.

5. The recording method for an optical recording medium according to claim 1, wherein the optical recording medium is an optical recording medium for recording information under a control of a constant rotational angular velocity.

6. A recording method for an optical recording medium having at least two recording layers capable of recording information, comprising following steps of:

setting a pattern of a recording strategy optimally set for recording the information into one of the recording layers; and changing a laser power in order to apply the pattern for recording the information into the another recording layer.

7. The recording method for an optical recording medium according to claim 6, wherein the pattern is a pattern for recording into a rewritable recording layer containing a phase-change material.

* * * * *